Jan. 3, 1956
H. C. GISLESON
2,729,345
BALED HAY AND STRAW DISTRIBUTOR
Filed Feb. 27, 1953
2 Sheets-Sheet 1
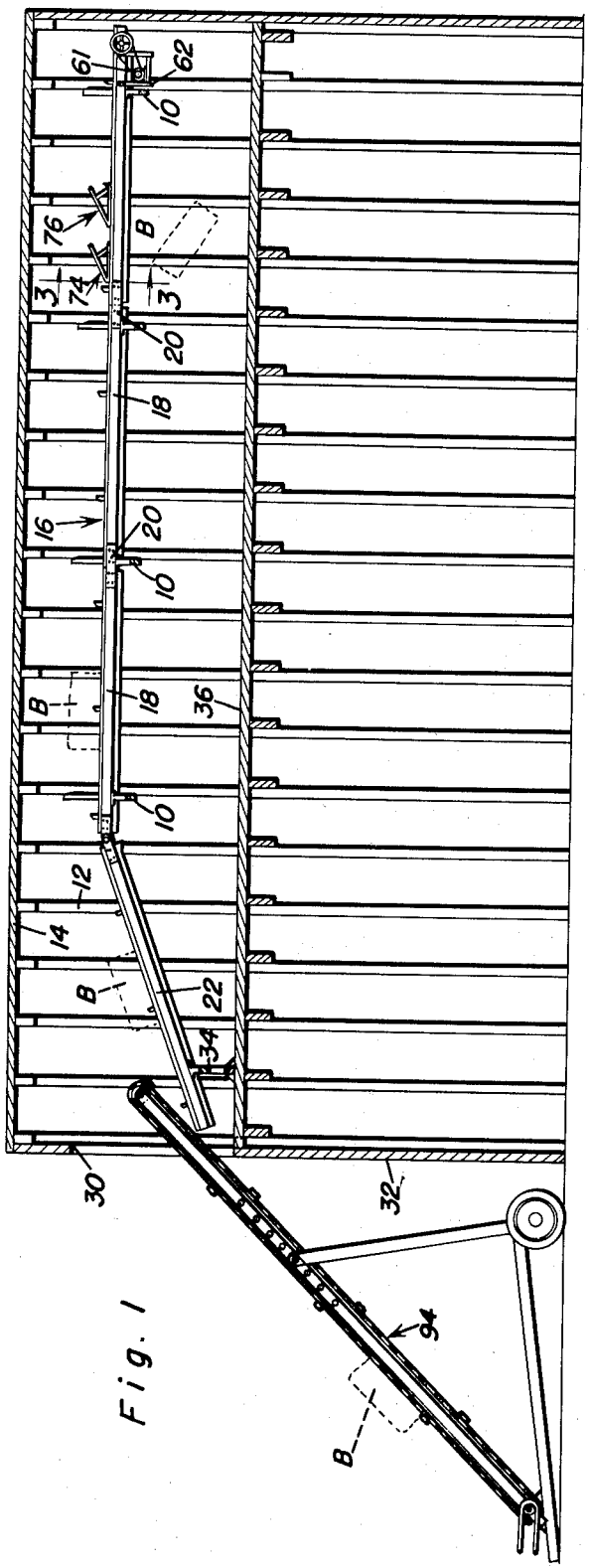
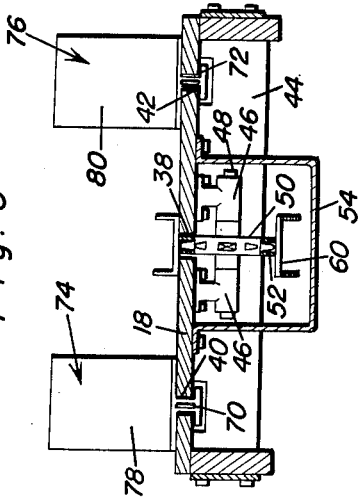
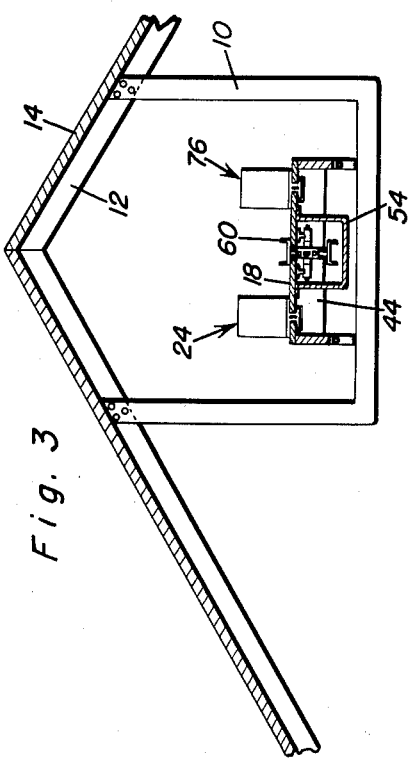
Henry C. Gisleson
INVENTOR.
BY *Clarence A. O'Brien*
*and Harvey B. Jackson*
Attorneys

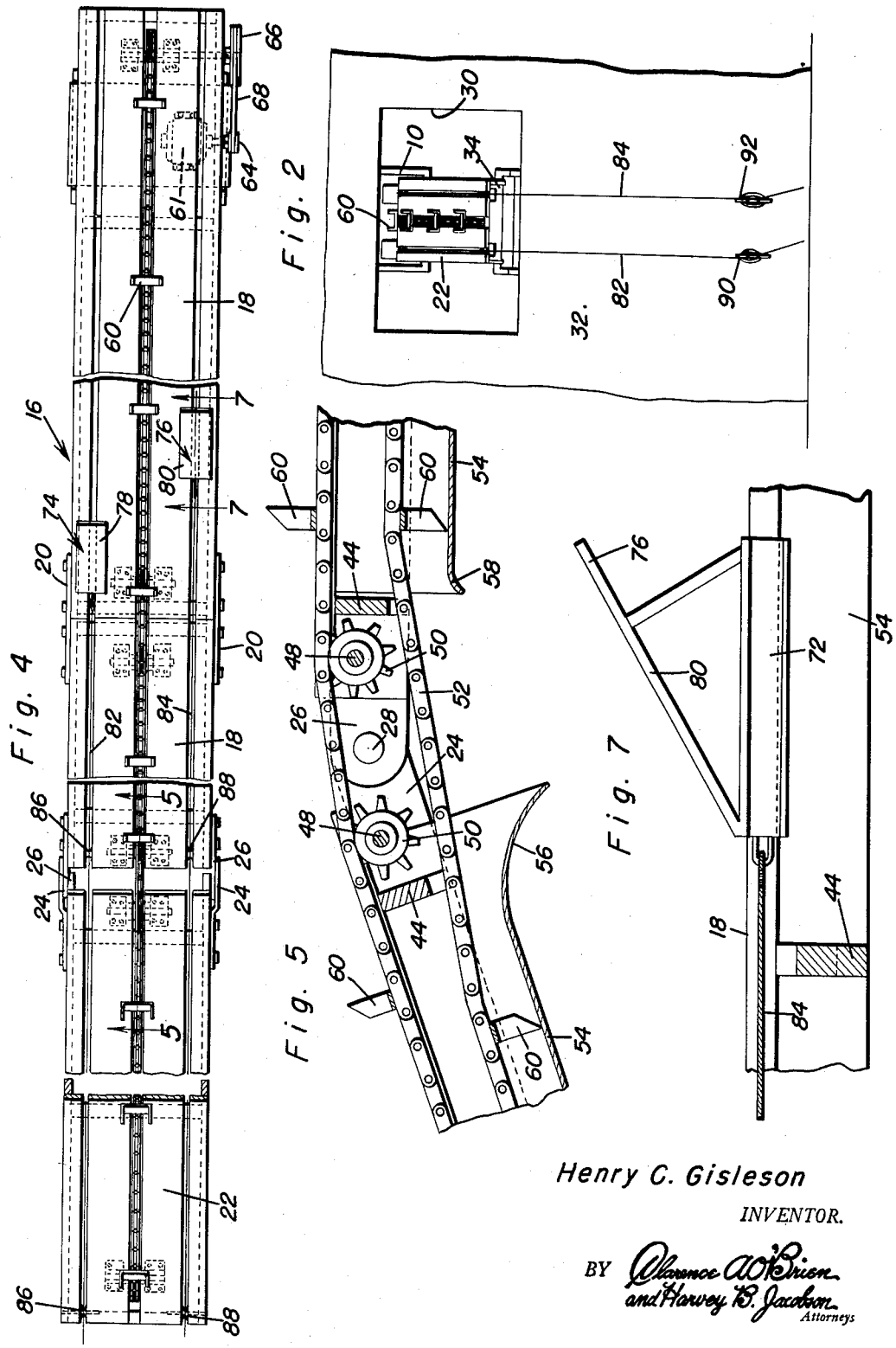

United States Patent Office 2,729,345
Patented Jan. 3, 1956

2,729,345

BALED HAY AND STRAW DISTRIBUTOR

Henry C. Gisleson, Luana, Iowa

Application February 27, 1953, Serial No. 339,273

2 Claims. (Cl. 214—16)

This invention relates to new and useful improvements in distributing apparatus for barns and the like and the primary object of the present invention is to provide an overhead supported conveyor system for barns involving novel and improved means for tripping and discharging bales of hay, straw or the like as the conveyor moves rearwardly in the barn.

Another important object of the present invention is to provide an overhead conveyor structure for barns involving longitudinally adjustable trip members that will lift and direct bales of hay, straw or the like from the conveyor whereby the storage space in a barn may be evenly loaded with baled material.

A further object of the present invention is to provide a baled hay and straw distributor apparatus wherein the longitudinally adjustable trip members are actuated by an operator standing close to the front end of a barn so that the baled material may be discharged from either side of the conveyor and at selected longitudinally spaced points of the conveyor.

A still further aim of the present invention is to provide a distributor for baled hay, straw or the like that is extremely simple and practical in construction, strong and reliable in use, efficient and durable in operation, inexpensive to manufacture, install and service, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal vertical sectional view of a barn and showing the present invention supported therein and in use;

Figure 2 is a fragmentary front elevational view of Figure 1 with the portable elevator conveyor removed;

Figure 3 is an enlarged transverse vertical sectional view taken substantially on the plane of section line of 3—3 of Figure 1;

Figure 4 is a top plan view of the present invention and with parts broken away for the convenience of explanation;

Figure 5 is an enlarged longitudinal vertical sectional view taken substantially on the plane of section line 5—5 of Figure 4;

Figure 6 is an enlarged fragmentary view of Figure 3 to show the cross sectional construction of the conveyor and platform; and Figure 7 is an enlarged fragmentary longitudinal vertical sectional view taken substantially on the plane of section line 7—7 of Figure 4.

Referring now to the drawings in detail, wherein for the purpose of illustration, there is disclosed a preferred embodiment of the present invention, the numeral 10 represents a plurality of longitudinally spaced, parallel, U-shaped hanger members whose leg portions are secured by suitable fastening means to the rafters 12 of a barn roof 14. These hanger members support a platform 16 composed of elongated sections 18 whose adjacent ends are joined by connecting straps 20.

The forwardmost of the platform sections, namely, section 22, is provided with rearwardly extending ears 24 at its rear end that are connected to forwardly extending ears 26 at the forward end of the next platform section by horizontal pivots 28, whereby the forward end of the section 22 may be selectively raised or lowered in accordance with the opening 30 in the forward wall of the barn 32. A support 34 on the bottom wall 36 of the barn attic portion engages and supports the forward end of the platform section 22.

Each platform section 18, 22 is provided with a central longitudinal slot 38 and a pair of spaced parallel guide slots 40 and 42 disposed on opposite sides of the central slot 38. Slots 38, 40 and 42 extend throughout the length of the platform sections thereby dividing the platform sections into three strips which are joined and spaced by transverse cross members 44 suitably secured to the undersides of the platform sections.

Bearings 46 are secured to the undersides of the platform sections 18, 22 at each end thereof and rotatably support horizontal shafts 48 on which sprockets 50 are suitably fixed. An endless sprocket chain or conveyor 52 engages the sprockets 50 and includes an upper flight that extends through the central slots 38 of the platform sections 18, 22.

Longitudinal shielding channels 54 are secured to the undersurfaces of the platforms sections 18, 22 and register with the central slots 38 so that the lower flight of chain 52 will be received in the channels 54 to be shielded thereby. The rear end of the channel on the forward platform section 22 is downwardly and outwardly flared, as at 56, and the forward end of the adjacent shielding channel is also downwardly and outwardly flared, as at 58, so that the U-shaped cleats 60 fixed to the chain 52 at longitudinally spaced points, may pass from the shielding channel of section 22 into the shielding channel of the next platform section without obstruction regardless as to the inclined position of section 22.

Cleats 60 have their web portions fixed to the chain 52 by any suitable means and the leg portions of the cleats are pointed to effectively engage bales of straw, hay or the like. The web portions of the cleats extend transversely across and overhang the chain 52 so that the cleats on the upper flight of the chain 52 will ride upon the upper faces of the platform sections 18, 22 as the upper flight moves rearwardly.

A mounting bracket 62 is secured to the rear end of the rearmost platform section and supports a motor 61 having a pulley 64 on its armature shaft that is connected to a pulley 66 on the last of the shafts 48 by an endless pulley belt 68, whereby the chain 52 will be driven with its upper flight moving rearwardly and its lower flight moving forwardly.

The H-shaped lower base portions 70 and 72 of bale tripping member 74 and 76 are slidably received in the guide slots 40 and 42 with the horizontal flanges of the base portions underlying the platform sections to restrict upward movement of the tripping members relative to the platform sections. The tripping members 74 and 76 are provided with upwardly and rearwardly inclined plate portions 78 and 80 that are secured to the upper flanges of the portions 70, 72 which slide upon the upper faces of the platform sections.

Means is provided for adjusting the tripping members 74 and 76 longitudinally of the platform 16. This means comprises adjusting cables 82 and 84 that are tied or suitably attached to the forward end portions of the tripping members 74 and 76. Cables 82 and 84 extend forwardly through the guide slots 40 and 42 and downwardly over pulleys 86 and 88 suitably held in the guide slots of the forward platform section 22 and the next adjacent platform section 18 and are engageable with holders 90 and 92 on the forward wall of the barn 32.

In practical use of the present invention, a portable elevator conveyor 94 is moved to the forward end of the barn and the upper end of the conveyor 94 is extended upwardly through opening 30 to overlie the forward platform section 22.

Bales of hay, straw or the like B are placed on the conveyor 94 and are elevated and dumped onto the section 22 in longitudinally extending position where certain of the cleats will engage one end of the bales and advance the bales rearwardly of the section 22. As the moving bales ride upwardly on either the plate portions 78 or 80, the bales will be lifted at one side thereof from the conveyor 52 forwardly of the end engaged by a cleat 60 and tipped sidewise off the side of the section 22 opposite the lifting portion 78 or 80 to fall onto the bottom wall 36 of the barn's attic portion. In this connection, it is to be noted that the plate portions 78, 80 are inclined at the requisite angle to cause such tipping of the bales before the cleat engaged end of the bales are disengaged from the cleats 60 by lifting of the bales.

The tripping members may be disposed at a desired point on the platform 16 so that the bales may be directed from either side of the platform and at any point along the length of the platform. In this manner, an even unloading of bales in the barn may be accomplished.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A distributor for baled hay, straw and the like, said distributor comprising a plurality of hanger members adapted to be secured within the top of a barn, a platform supported by said hanger members and adapted to support bales in longitudinally extending position thereon, a longitudinal shield channel secured to the undersurface of said platform, said platform having a central longitudinal slot in registry with said channel, a power driven endless conveyor supported by the platform and having an upper flight movable in said slot and a lower flight movable in said channel, longitudinally spaced cleats fixed to the conveyor, the cleats on said upper flight riding upon the upper face of said platform and engaging one end of the bales to advance the bales along the platform, and a longitudinally adjustable bale tripping member slidably adjustably supported on the platform at each side thereof and inclining upwardly in the direction of advance of the bales to tip the bales sidewise off the opposite side of the platform.

2. A distributor for baled hay, straw and the like, said distributor comprising a plurality of hanger members adapted to be secured within the top of a barn, a platform supported by said hanger members and adapted to support bales in longitudinally extending position thereon, a longitudinal shield channel secured to the undersurface of said platform, said platform having a central longitudinal slot in registry with said channel, a power driven endless conveyor supported by the platform and having an upper flight movable in said slot and a lower flight movable in said channel, longitudinally spaced cleats fixed to the conveyor, the cleats on said upper flight riding upon the upper face of said platform and engaging one end of the bales to advance the bales along the platform, said platform having a pair of guide slots on opposite sides of said central slot, an elongated tripping member at each side of the platform inclining upwardly in the direction of advance of the bales to tip the bales sidewise off the opposite side of the platform, and each having a base slidably mounted in one of the guide slots for sliding adjustment of the tripping members longitudinally of the platform, and means for slidably adjusting the tripping members to position either in advance of the other.

References Cited in the file of this patent

UNITED STATES PATENTS

| 230,144 | Merry | July 20, 1880 |
| 702,408 | Cook | June 17, 1902 |
| 1,465,609 | MacBeth et al. | Aug. 21, 1923 |
| 1,716,979 | Ronemous | June 11, 1929 |
| 1,884,399 | Vail | Oct. 25, 1932 |
| 2,063,431 | Grayson et al. | Dec. 8, 1936 |
| 2,495,647 | Vaughn et al. | Jan. 24, 1950 |
| 2,639,024 | Kneer | May 19, 1953 |